United States Patent
Chen et al.

(10) Patent No.: US 9,665,109 B2
(45) Date of Patent: May 30, 2017

(54) SOLICITING USER INPUT FOR THERMOSTAT CONTROL

(71) Applicant: Google Inc., Mountain View, CA (US)

(72) Inventors: Kevin Chen, Menlo Park, CA (US); Ross Koningstein, Atherton, CA (US); James Charles Schmalzried, San Jose, CA (US); Kurt Adelberger, San Mateo, CA (US)

(73) Assignee: Google Inc., Mountain View, CA (US)

( * ) Notice: Subject to any disclaimer, the term of this patent is extended or adjusted under 35 U.S.C. 154(b) by 735 days.

(21) Appl. No.: 14/037,878

(22) Filed: Sep. 26, 2013

(65) Prior Publication Data

US 2015/0083813 A1 Mar. 26, 2015

(51) Int. Cl.
| | | |
|---|---|---|
| *F24F 11/053* | (2006.01) | |
| *F23N 5/20* | (2006.01) | |
| *G05B 11/01* | (2006.01) | |
| *G05D 23/19* | (2006.01) | |
| *G06Q 50/00* | (2012.01) | |
| *F24F 11/00* | (2006.01) | |

(52) U.S. Cl.
CPC ........ *G05D 23/1904* (2013.01); *F24F 11/006* (2013.01); *G06Q 50/00* (2013.01)

(58) Field of Classification Search
CPC .... F24F 11/006; G05D 23/1904; G06Q 50/00
USPC ........... 236/46 R, 1 C; 700/19, 278; 705/412
See application file for complete search history.

(56) References Cited

U.S. PATENT DOCUMENTS

| | | | | |
|---|---|---|---|---|
| 4,027,171 A | * | 5/1977 | Browder | G05D 23/19 236/46 R |
| 4,261,037 A | * | 4/1981 | Hicks | G06Q 50/06 324/103 R |
| 4,308,991 A | | 1/1982 | Peinetti et al. | |
| 4,341,345 A | * | 7/1982 | Hammer | F25D 29/00 165/257 |
| 4,351,028 A | * | 9/1982 | Peddie | G01R 21/133 324/116 |
| 4,388,692 A | | 6/1983 | Jones et al. | |
| 4,632,304 A | * | 12/1986 | Newell, III | G05D 23/24 165/254 |

(Continued)

FOREIGN PATENT DOCUMENTS

WO 2008/109168 9/2008

OTHER PUBLICATIONS

International Search Report and Written Opinion in International Application No. PCT/US14/56784, mailed Jun. 4, 2015, 8 pages.

(Continued)

*Primary Examiner* — Henry Crenshaw
(74) *Attorney, Agent, or Firm* — Fish & Richardson P.C.

(57) ABSTRACT

A device or arrangement may be configured to receive a temperature limit such as an acceptable maximum temperature as well as a tolerance measure such as a number of acceptable events, the events causing the temperature to be outside of the temperature limit. An air comfort device may be operated based on the received temperature limit and the tolerance measure. A potential cost value may be provided based on a temperature limit and tolerance measure. A temperature limit and tolerance measure may be calculated based on a target cost value such that the arrangement may modify a temperature limit and/or tolerance measure to achieve the target cost value.

20 Claims, 6 Drawing Sheets

(56) References Cited

U.S. PATENT DOCUMENTS

| | | | | |
|---|---|---|---|---|
| 4,803,632 | A * | 2/1989 | Frew | G01D 4/006 |
| | | | | 340/12.32 |
| 5,237,507 | A * | 8/1993 | Chasek | G06Q 30/02 |
| | | | | 324/116 |
| 5,621,654 | A * | 4/1997 | Cohen | F01K 13/02 |
| | | | | 700/287 |
| 2003/0065407 | A1 * | 4/2003 | Johnson | G05B 15/02 |
| | | | | 700/19 |
| 2006/0111796 | A1 | 5/2006 | Van Heteren | |
| 2012/0123594 | A1 * | 5/2012 | Finch | G05B 15/02 |
| | | | | 700/278 |
| 2013/0013118 | A1 | 1/2013 | Merkulov et al. | |

OTHER PUBLICATIONS

EnergyHub,"Two Cooperative Utilities Deploying EnergyHub's Mercury™ Smart Thermostat Platform This Summer", Available at: http://www.energyhub.com/news/two-cooperative-utilities-deploying-mercury/. Visited on: Aug. 21, 2013, Jul. 17, 2012.

Pepco,"Peak Energy Savings Credit", Available at: http://www.pepco.com/energy/blueprint/smetersmd/peakenergy/. Date visited: Aug. 21, 2013, 2013.

Perez,"EnergyHub Launches Energy Management System for Consumers", Available at: http://techcrunch.com/2011/08/30/energyhub-launches-energy-management-system-for-consumers/. Visited on: Aug. 21, 2013, Aug. 30, 2011.

* cited by examiner

SOLICITING USER INPUT FOR THERMOSTAT CONTROL

BACKGROUND

Electricity consumption, such as residential electricity consumption, can be a major contributor to peak loads on an electric grid, especially during peak usage times (e.g., summer peaks loads, driven by air conditioning). To provide valuable grid services, such as curtailment, at times when a grid is strained and real-time power prices are high, the set temperature points of controllable thermostats may be modified to shift air conditioning electric loads away from peak times. These temperature point changes may cause an increase or decrease in the temperature during at peak times, and/or an increase or reduction in the temperature point prior to peak times to allow for a gradual increase in temperature during peak times. Traditionally, an electricity provider may request that an end user opt into a program that enables modification of operation of the user's air comfort device during peak conditions (e.g., temperatures above or below a given threshold temperature). However, the user may have limited control over modifications to operation of an air comfort device while participating in such a program. For example, a user may only be given an option to opt into or out of the program and may not have any control over how high or low the temperature may reach at the user's residence.

BRIEF SUMMARY

According to implementations of the disclosed subject matter, a device may be configured to receive a temperature limit as well as a tolerance measure for events outside of the temperature limit. An air comfort device may be operated based on the received temperature limit and the tolerance measure. The temperature limit may be a single temperature or a temperature range. The tolerance measure may include a number of distinct events in which the temperature is outside of the temperature limit, an amount of time during which the temperature is outside of the temperature limit, and/or an extent to which the temperature is permitted to be outside of the temperature limit. The device may be configured to operate the air comfort device outside the temperature limit based on the tolerance measure. The device may be configured to receive a cost target value and to modify the temperature limit and/or the tolerance measure based on the cost target value. The device may be configured to generate a projected cost value based on the temperature limit and/or the tolerance measure as well as operate the air comfort device based on the projected cost value. A user may be provided with multiple comfort ranges, a comfort range containing a temperature limit, a tolerance measure, and/or a projected cost value. An energy cost value may be determined based on a weighted average of the number of hours operating according to a pre-package option, an ideal set point for a pre-package, the size of a range of temperatures identified by the temperature limit, and/or the relative location of an ideal set point with respect to the range of temperatures identified by the temperature limit.

According to implementations of the disclosed subject matter, an arrangement may receive a temperature limit and a tolerance measure for events outside the temperature limit. The arrangement may operate an air comfort device based on the received temperature limit and the tolerance measure.

According to implementations of the disclosed subject matter, an arrangement may receive a first temperature limit from a user and provide an opt-in option to the user, the opt-in option comprising an incentive to modify the first temperature limit to a second temperature limit. The user may select the opt-in option and the arrangement may operate an air comfort device based on the second temperature limit. The incentive may be a projected cost value and the second temperature limit may be a temperature range that is different than a temperature range identified by the first temperature limit.

Systems and techniques according to the present disclosure enable modified operation of air comfort devices based on temperature limits, tolerance measures, and/or cost values. Additional features, advantages, and implementations of the disclosed subject matter may be set forth or apparent from consideration of the following detailed description, drawings, and claims. Moreover, it is to be understood that both the foregoing summary and the following detailed description include examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Providing a user with control over various aspects of an air comfort device control may enable the user to determine an optimal air comfort device configuration based on one or more temperature limits, tolerance measures, and/or cost. An air comfort device may be any applicable device configured to modify and/or manage climate properties and may include a cooling unit, a heating unit, a heat pump, a dehumidifier, a humidifier, a fan, or the like. According to implementations of the disclosed subject matter, the arrangement may provide a user with multiple options for air comfort device control. For example, the arrangement may enable a user to select a temperature limit (e.g., 74 degrees) such that an air comfort device maintains an area temperature below the temperature limit. Additionally, the arrangement may provide a user with an option to elect a tolerance measure that enforces the number of times an air comfort device may operate beyond the temperature. Additionally, the arrangement may allow a user to select a target cost value (e.g., $40/year) and an air comfort device may operate based on the target cost value by modifying the temperature limit, tolerance measure, or both to achieve the target cost value.

A user may be presented with two or more comfort ranges from which the user can select one. For example, a user may select from a Home, Away, or Asleep option. Comfort ranges may include a temperature limit, a tolerance measure, and a projected cost value. Additionally, the user may select an umbrella flexibility range that may apply to two or more comfort ranges. For example, a user may select 3 degree variance in temperature to be applied across all comfort ranges. This umbrella flexibility may enable the arrangement to increase the temperature measure for a selected comfort range by 3 degrees.

Although the substance of the disclosed subject matter refers an upper bound on temperature (e.g., a temperature limit of 74 degrees such that the temperature is not intended to reach above 74 degrees), the disclosed subject matter may be adopted mutatis mutandis to apply to a lower bound on temperature (e.g., a temperature limit of 63 degrees such that the temperature is not intended to reach below 63 degrees via a heating component or overcooling by a cooling component).

Figure 1:
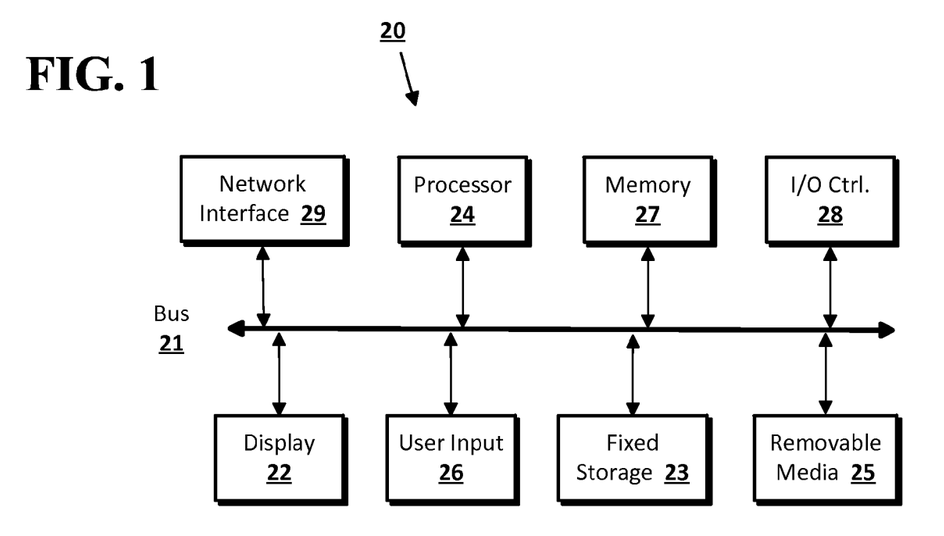
FIG. 1 shows a computer according to an implementation of the disclosed subject matter.

Implementations of the presently disclosed subject matter may be implemented in and used with a variety of component and network architectures. FIG. 1 is an example computer 20 suitable for implementing implementations of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM can include the main memory into which the operating system and application programs are loaded. The ROM or flash memory can contain, among other code, the Basic Input-Output system (BIOS) which controls basic hardware operation such as the interaction with peripheral components. Applications resident with the computer 20 can be stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection, WiFi, Zigbee™, Z-Wave™, or the like. For example, the network interface 29 may allow the computer to communicate with other computers via one or more local, wide-area, or other networks, as shown in FIG. 2.

Many other devices or components (not shown) may be connected in a similar manner (e.g., thermostat, appliances, lighting, electric vehicle chargers, pumps, document scanners, digital cameras and so on). Conversely, all of the components shown in FIG. 1 need not be present to practice the present disclosure. The components can be interconnected in different ways from that shown. The operation of a computer such as that shown in FIG. 1 is readily known in the art and is not discussed in detail in this application. Code to implement the present disclosure can be stored in computer-readable storage media such as one or more of the memory 27, fixed storage 23, removable media 25, or on a remote storage location.

Figure 2:
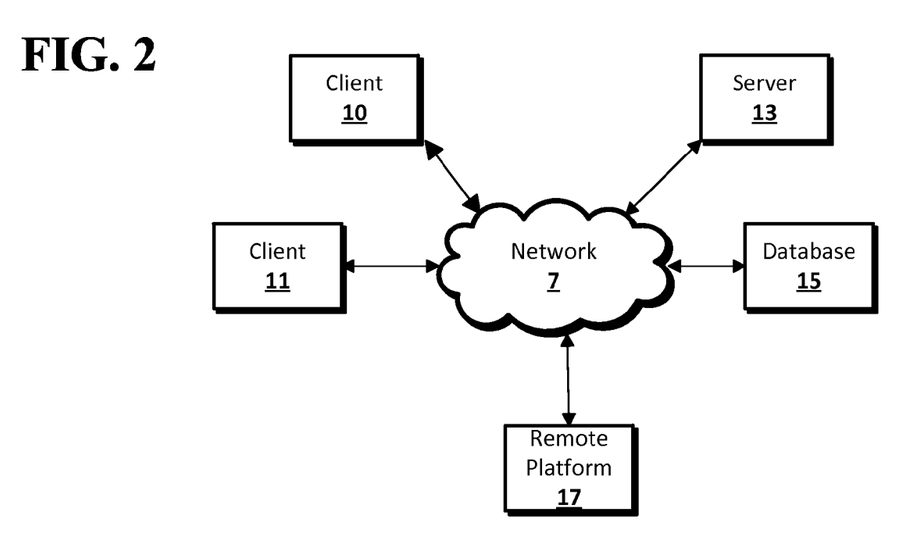
FIG. 2 shows a network configuration according to an implementation of the disclosed subject matter.

FIG. 2 shows an example network arrangement according to an implementation of the disclosed subject matter. One or more clients 10, 11, such as thermostats, local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

According to implementations of the disclosed subject matter, an arrangement may operate an air comfort device based on at least a temperature limit and a tolerance measure. The temperature limit may indicate a temperature point that is not to be exceeded during regular operation of the air comfort device. The tolerance measure may provide a number of events during which the air comfort device may operate outside the temperature limit (i.e., non-regular operation of the air comfort device), as disclosed herein. Additionally, a projected cost value may be generated based on the temperature limit and tolerance measure and can indicate an estimated cost saving/earning that may be provided to a user based on a specific combination of temperature limit and tolerance measure. Additionally, a target cost value may enable the arrangement to select a combination of temperature limit and tolerance measure that results in a saving/earning equal or close to the target cost value. A device, such a thermostat, may be in communication with one or more air comfort devices and operate the one or more air comfort devices based on a temperature limit, tolerance measure, and/or cost value (i.e., projected or target cost value, as disclosed herein). It will be understood that although this disclosure references an "air comfort device", multiple air comfort devices and/or components associated with modifying and/or managing climate properties may be utilized to implement the techniques disclosed herein.

A temperature limit may be any applicable limit such as a single temperature (e.g., above 74 degrees, below 60 degrees, 65 degrees, etc.), a temperature range (e.g., 70 degrees-74 degrees), a purely qualitative descriptor of comfort, or the like. According to implementations of the disclosed subject matter, a tolerance measure may be any applicable counter such as a number of distinct events in which the temperature is outside of a temperature limit, an amount of time during which the temperature is outside of a temperature limit, an extent to which the temperature is permitted to be outside of a temperature limit, or the like. An example of a number of distinct events in which the temperature is outside of a temperature limit is when the arrangement is configured to enable the air-conditioned temperature to be outside the range defined by a temperature limit for 25 distinct times in a given year. Specifically, a user provided temperature limit of 74 degrees may be exceeded up to 25 times in a given year, but no more than 25 times. An example of an amount of time during which the temperature is outside of a temperature limit is when the arrangement is configured to enable the air-conditioned temperature to be outside the range defined by a temperature limit for 20 hours a month. Specifically, the 20 hours may be spread across the month in any applicable manner, and may be spread such that the temperature rises above the temperature limit for only a few minutes (e.g., 25 minutes) in a given day. An example an extent to which the temperature is permitted to be outside of a temperature limit is when the arrangement is configured to enable the air-conditioned temperature to rise up to 5 degrees above a temperature limit. Alternatively, the temperature may rise up to 5 degrees above a temperature limit up to 10 times in a given year.

According to an implementation of the disclosed subject matter, a device such as a thermostat may be configured to receive a temperature limit. The temperature limit may be provided by a user via any applicable device such as the thermostat itself (via an input component in connection with the thermostat), a keyboard, a numerical pad, a mouse, a mobile phone, a tablet, a touchscreen display, a television, a wearable device, or the like. As an example, the user may input a temperature limit of 74 degrees via a touchscreen that is part of the user's thermostat. As another example, a user may access a thermostat application on her mobile phone. The user may input a temperature limit of 74 degrees via the keyboard associated with the mobile phone. The mobile phone may communicate with the thermostat and provide the user input 74 degrees to the thermostat. As disclosed herein, the temperature may be any applicable limit such as a single temperature, a temperature range, or the like. As an example, a user may provide a temperature limit of 70 degrees-74 degrees to the thermostat.

According to an implementation of the disclosed subject matter, the device may be configured to receive a tolerance measure corresponding to events outside of the temperature limit. The tolerance measure may be provided by a user via any applicable device such as the thermostat itself (via an input component in connection with the thermostat), a keyboard, a numerical pad, a mouse, a mobile phone, a tablet, a touchscreen display, a television, a wearable device, or the like, and may be provided along with a temperature limit. As an example, a user may input a temperature limit of 74 degrees as well as a tolerance measure of 5 events per month. The tolerance measure may be applied according to the techniques disclosed herein such as to determine the maximum number of times the arrangement may operate outside a temperature limit, to calculate a projected cost value, to achieve a target cost value, or the like. Continuing the previous example, a projected cost value of $7 may be determined based on the user provided temperature limit of 74 degrees and tolerance measure of 5 events per month. As another example, the arrangement may select 5 days during the given month during which the user's air comfort device operates at a desired temperature point of greater than 74 degrees. The arrangement may operate the air comfort device above 74 degrees 5 times prior to the end of the month. However, based on the tolerance measure, at least according to this example, the arrangement may not operate the air comfort device above 74 degrees for an additional time in the given month.

According to an implementation of the disclosed subject matter, a cost target value may be provided to the arrangement. The cost target value may be a target saving/earning such that a user or the arrangement may intend to adjust a temperature limit and/or a tolerance measure to achieve the cost target value. The cost target value may be provided by the user or may be dynamically determined by the arrangement based on any applicable factor such as a user history, an average cost earning/saving, a manufacture suggestion, or the like. The arrangement may modify a temperature limit and/or a tolerance measure based on the cost target value. More specifically, the arrangement may modify a temperature limit and/or a tolerance measure dynamically for a given duration in order to achieve a cost target value at the end of the given duration. As an example, a user may provide the arrangement with a cost target value of 50 dollars per year. Based on the cost target value, the arrangement may either suggest a temperature limit and/or a tolerance measure or may automatically modify a temperature limit and/or a tolerance measure. Specifically, if the aggregate savings for the user that selected the cost target value of 50 dollars per year is only 40 dollars after 11 months, the arrangement may drastically modify the temperature limit and tolerance measure to reach the 50 dollars per year target. Accordingly, an air comfort device operation may be modified based on the cost target value.

As disclosed herein, a projected cost value may be generated based on a temperature limit and/or a tolerance measure. The projected cost value may predict the expected earning/saving that may result from the implementation of a temperature limit and/or tolerance measure. For example, a temperature limit of 75 degrees and a tolerance measure of 5 events may result in in a projected cost value of 15 dollars whereas a temperature limit of 78 degrees and a tolerance measure of 5 events may result in in a projected cost value of 25. The projected cost value may be provided to a user as the user is selecting or modifying a temperature limit and/or tolerance measure. The projected cost value may change as the user modifies the temperature limit or tolerance measure to reflect the expected savings/earnings that are projected to result from the combination of a given temperature limit and/or tolerance measure.

Figure 5:
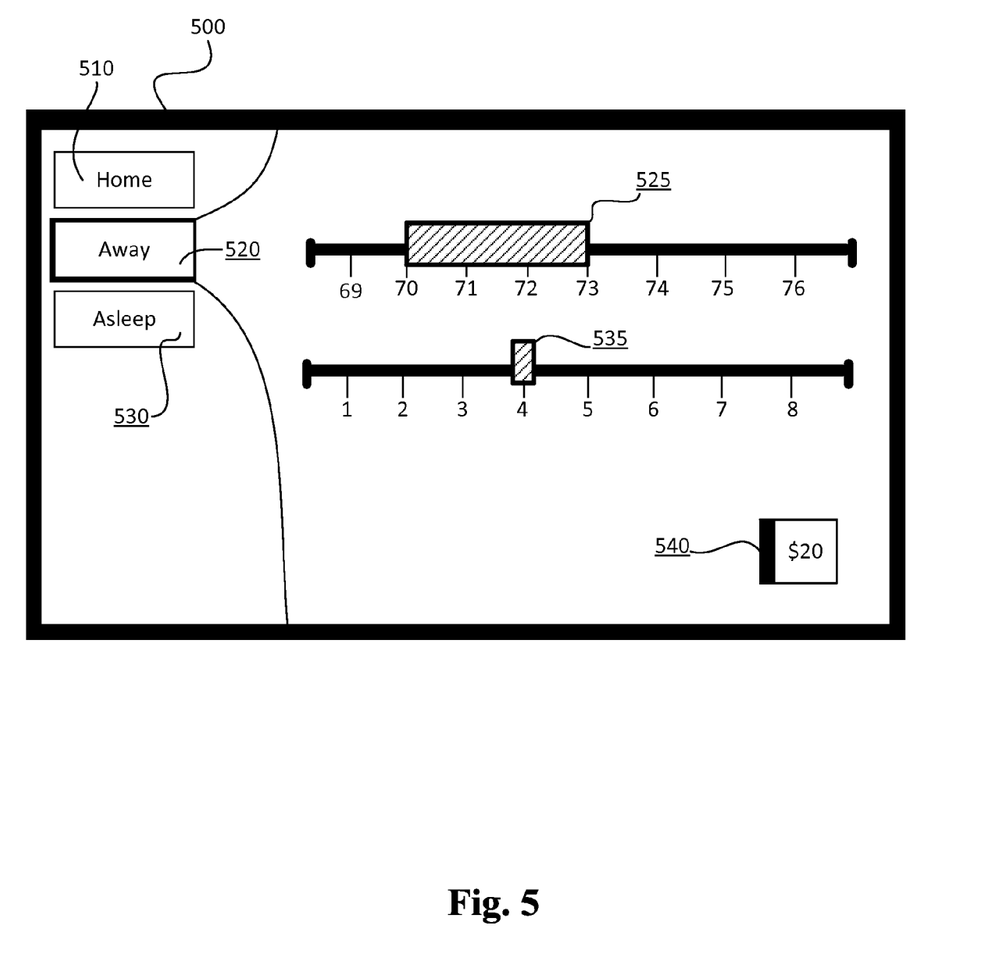
FIG. 5 shows an example visualization corresponding to comfort ranges according to an implementation of the disclosed subject matter.

According to an implementation of the disclosed subject matter, one or more comfort ranges may be available for selection. A comfort range may contain a temperature limit and/or a tolerance measure. Additionally, a comfort range may contain a projected cost value associated with a selection of the comfort range. One or comfort ranges may be provided for selection by a user. As an example, as shown in FIG. 5, a user may select from a Home comfort range 510, an Away comfort range 520, and an Asleep comfort range 530. Each comfort range may have a corresponding temperature limit and tolerance measure associate with it. As shown, the Away comfort range 520 may have a temperature limit range 525 of 70 degrees to 73 degrees. Additionally, the Away comfort range 520 may have a tolerance measure 535 of 4 events. As disclosed herein, the temperature limit 525 and tolerance measure 535 may correspond to an expected operating temperature of between 70 and 73 degrees, and an operating temperature outside this range for up to 4 times. A projected cost value 540 may be provided based on the temperature limit and tolerance measure. The user may select a first comfort range for a first duration and a second comfort range for a second duration. For example, a user may select a Home comfort range between 5 PM and 10 PM during weekdays and an Away comfort range between 10 AM and 5 PM during weekdays.

A projected cost value may be based on any applicable factor such as a weighted average of the number of hours operating according to a\ comfort range, an ideal set point for a comfort range (e.g., selected by a user or by the arrangement), the size of a range of temperatures identified by the temperature limit, the relative location of an ideal set point with respect to the range of temperatures identified by the temperature limit, or the like. A projected cost value and/or a technique to determine a projected cost value may dynamically itself based on updates to any of the factors. For example, if an actual cost saving/earning during implementation of a comfort range is lower than an originally projected then the arrangement may adjust a weight that is used to determine the projected cost value to reflect the lower savings.

Figure 6:
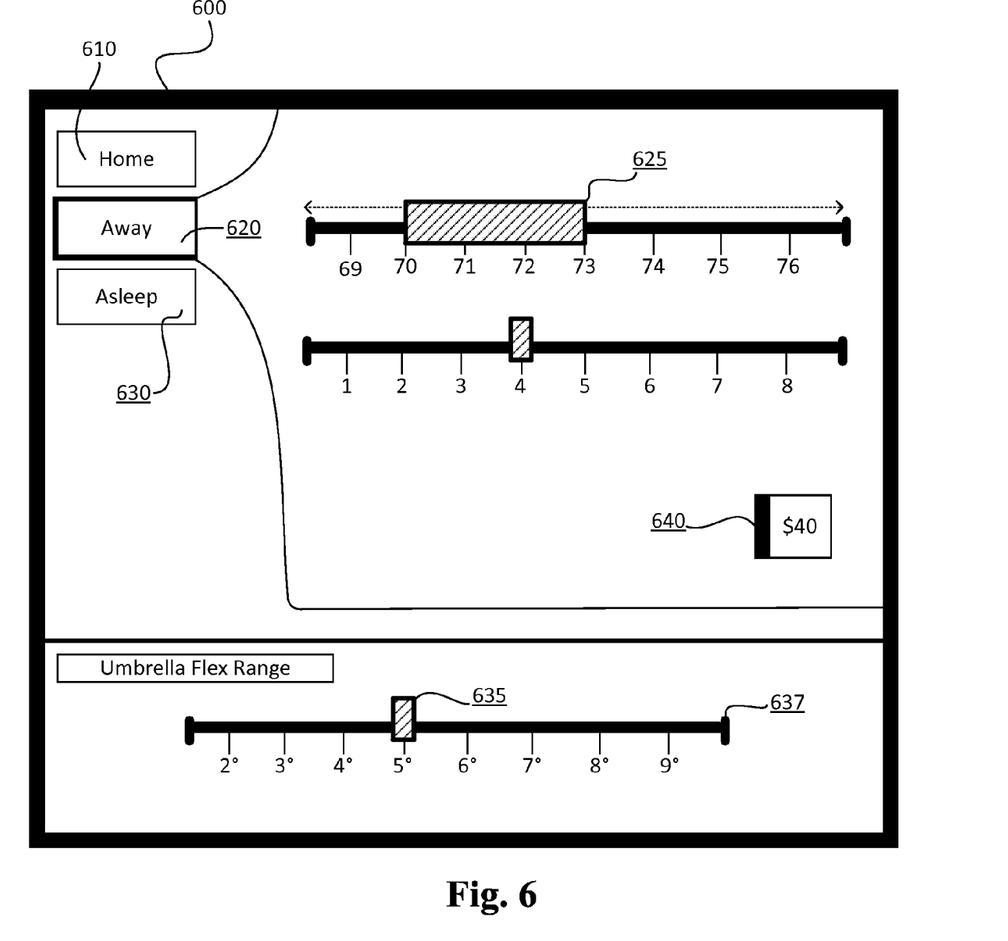
FIG. 6 shows an example visualization corresponding to an umbrella range according to an implementation of the disclosed subject matter.
Figure 7:
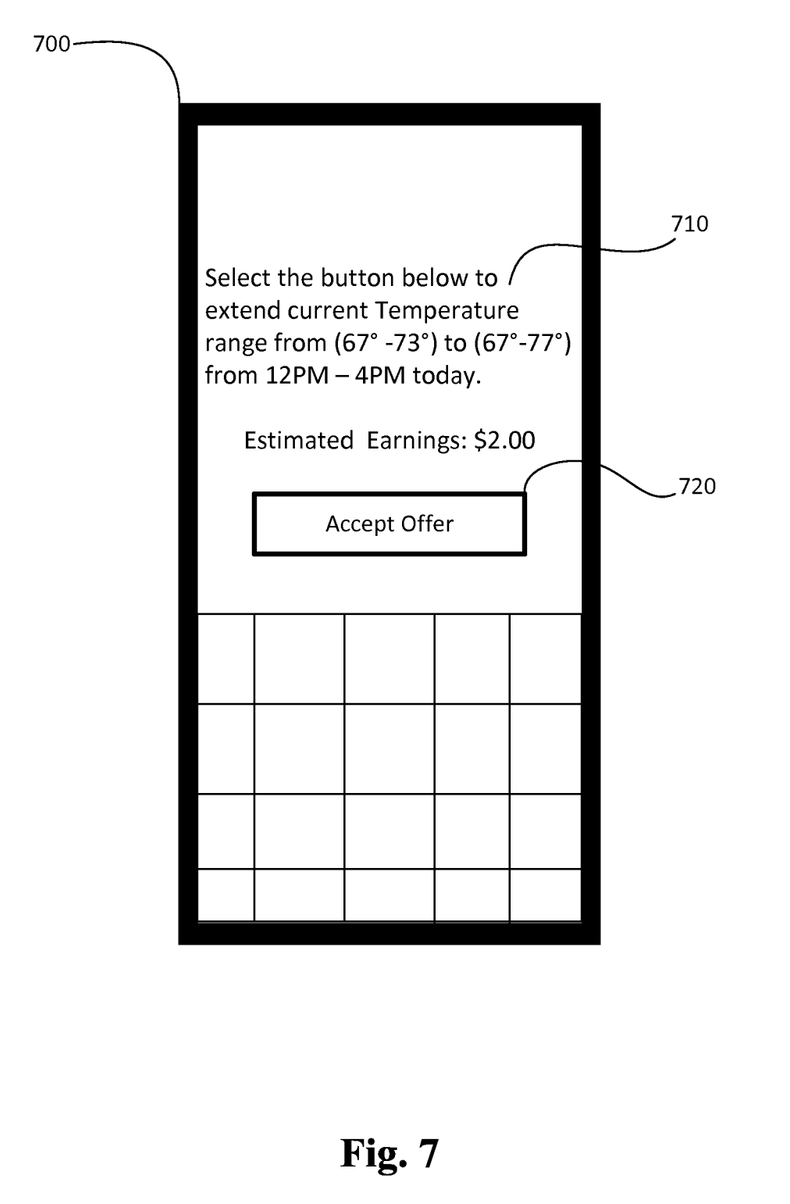
FIG. 7 shows an example visualization corresponding to temperature limit modification opt-in option according to an implementation of the disclosed subject matter.

According to an implementation of the disclosed subject matter, an umbrella flexibility range may be provided to the arrangement. An umbrella flexibility range may allow a user to provide a temperature limit and or tolerance measure variance that applies to multiple comfort ranges, enabling the user to avoid individually adjusting the temperature limit and or tolerance measure for multiple comfort ranges. The umbrella flexibility range may be a user selected range. More specifically, a user may provide an umbrella flexibility range (e.g., ±3 degrees) which applies universally to two or more comfort ranges. As an illustrative example, as shown in FIG. 6, three comfort ranges: Home 610, Away 620, and Asleep 630 may be made available to a user. Additionally, the user may be able to provide an umbrella flex range 635 of 5 degrees by sliding a point on an umbrella flex range bar 637. Based on the umbrella flex range (i.e., 5 degrees), all three comfort ranges may be modified. For example, the Away comfort range originally tuned to have a temperature limit range of 70 degrees to 73 degrees may be modified to now apply a temperature limit range of 65 degrees to 78 degrees. Further, the projected cost value 640 may be updated based on an umbrella flexibility range.

Figure 3:
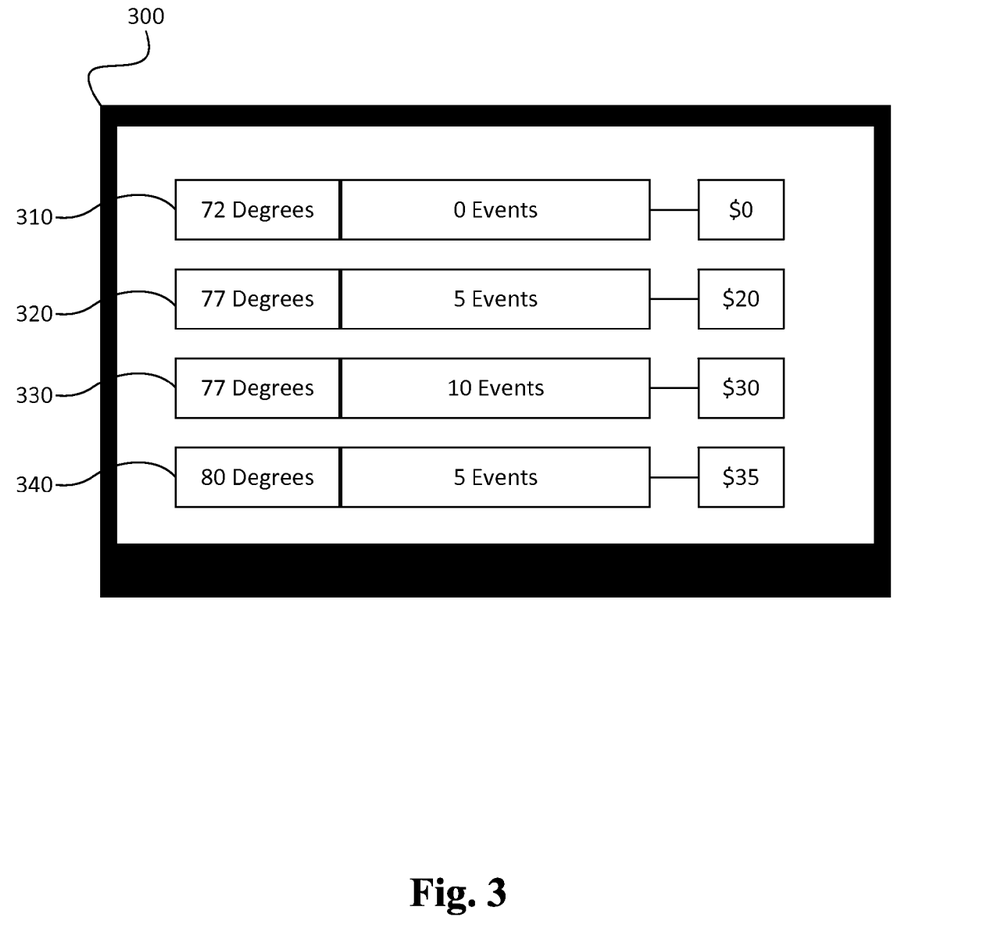
FIG. 3 shows an example visualization corresponding to temperature control options according to an implementation of the disclosed subject matter.

According to an implementation of the disclosed subject matter, a user may receive an opt-in option that contains an incentive to modify a current temperature limit setting to a second temperature limit setting. Acceptance/selection of the option may enable the user to receive the incentive which may be a financial incentive such as an amount of money earned or saved based on modifying the temperature limit. As disclosed herein, the temperature limit may be a specific temperature such that the modification is a second specific temperature or may be a temperature range such that the modification alters the range. In an illustrative example, a user's thermostat unit may currently be configured for a temperature limit of between 67 degrees and 73 degrees. On a peak usage day (e.g., on an above average heat day), the arrangement may transmit a message 710 to the user's mobile device 700 as shown in FIG. 3. The message 710 may indicate that the user can earn $2 by extending the current temperature range (i.e., 67 degrees to 73 degrees) to (67 degrees-77 degrees). The user may opt-in by selecting the 'Accept Offer' button 720 and, based on the selection, the thermostat may be reconfigured to update the temperature limit to (67 degrees-77 degrees).

FIG. 3 shows an illustrative example of an implementation of the disclosed subject matter. As shown in FIG. 3, a user may be provided with multiple air-conditioning options to select from. A first option 310 may allow the user to select a temperature limit (i.e., 72 degrees) without a tolerance measure (i.e., 0 events). A corresponding projected cost value of $0 may be provided to the user. Here, the cost value may be $0 as there are no events where the temperature may be outside the temperature limit. A second option 320 may allow the user to select a temperature limit of 77 degrees and a tolerance measure of 5 events. The corresponding projected cost value of $20 may be provided to the user based on the temperature limit and tolerance measure. A third option 330 may allow the user to select a temperature limit of 77 degrees and a tolerance measure of 10 events. The corresponding projected cost value of $30 may be provided to the user based on the temperature limit and tolerance measure. Notably, the projected cost value for the third option is higher than the second option as the number of events where the temperature may be outside the temperature limit is greater with the third option then the second option. A fourth option 340 may allow the user to select a temperature limit of 80 degrees and a tolerance measure of 5 events. The corresponding projected cost value of $35 may be provided to the user based on the temperature limit and tolerance measure. Notably, the projected cost value for the fourth option is higher than the second option as the temperature limit is higher with the fourth option then the second option. A user may be presented options 1-4 on a thermostat 300 display screen and may select one of the options be touching the thermostat 300 display screen in a respective area.

Figure 4:
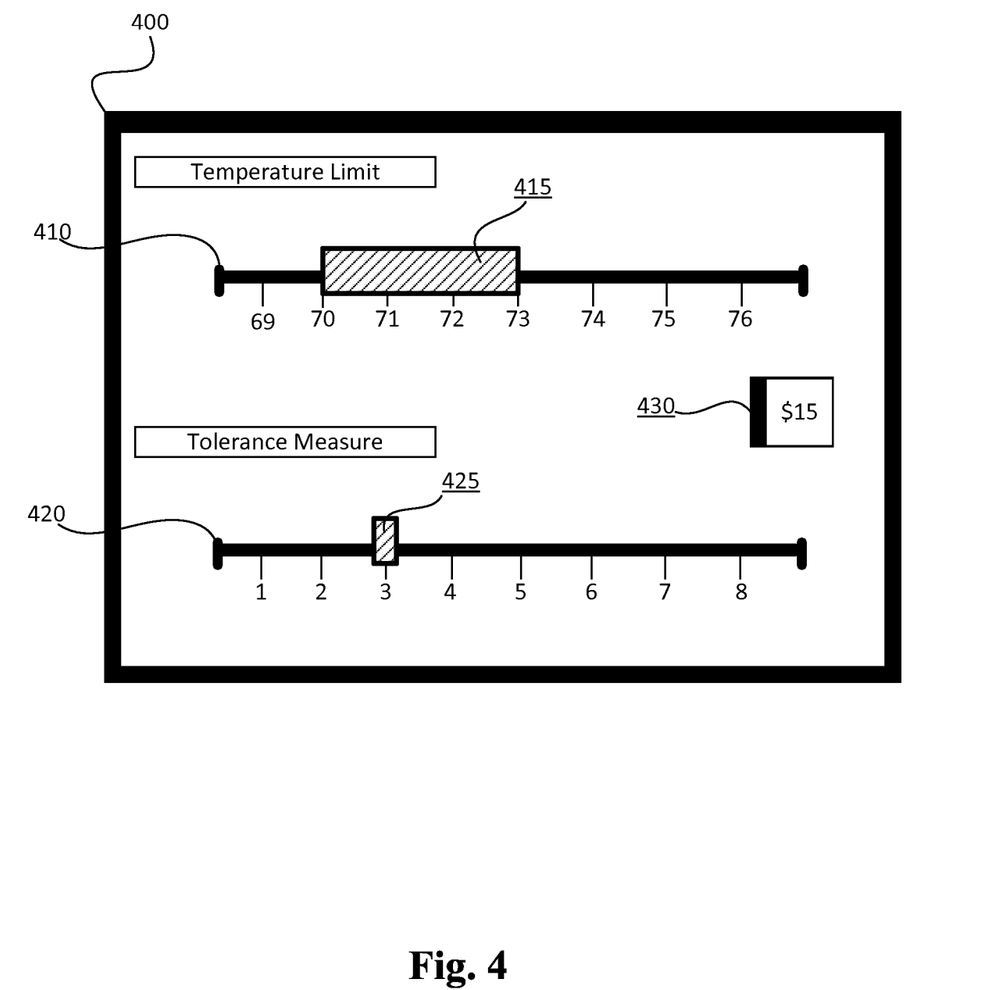
FIG. 4 shows an example visualization corresponding to temperature limit and tolerance measures according to an implementation of the disclosed subject matter.

FIG. 4 shows an illustrative example of an implementation of the disclosed subject matter. As shown in FIG. 4, a temperature limit slider bar 410 may be presented that enables selection of a temperature or temperature range 415. Similarly, a tolerance measure slider bar 420 may be presented that enable s selection of a tolerance measure 425. A projected cost value 430 may be provided based on the selected temperature limit and tolerance measure. As shown in FIG. 4, a user may be provided a projected energy cost of 15 dollars based on a temperature limit range 415 of 70 degrees to 73 degrees and a tolerance measure 425 of 3 events. Sliding the selected value for either the temperature limit or the tolerance measure may cause the projected energy cost to change. A user may be presented the temperature limit bar 410 and the tolerance measure bar 420 on a tablet 400 and may select one of the options be touching the tablet 400 touch screen in a respective area.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A method comprising:
receiving, by a computing device, a temperature limit that indicates a maximum temperature to maintain in a temperature area or a minimum temperature to maintain in the temperature area;
receiving, by the computing device, a tolerance measure that indicates a maximum amount of time that the temperature area is permitted to be maintained at temperatures outside of the temperature limit;
identifying, by the computing device, a total amount of time that the temperature area has been maintained at temperatures outside of the temperature limit;
determining, by the computing device, whether the total amount of time that the temperature area has been maintained at temperatures outside of the temperature limit equals or exceeds the maximum amount of time that the temperature area is permitted to be maintained at temperatures outside of the temperature limit; and
in response to determining that the total amount of time that the temperature area has been maintained at temperatures outside of the temperature limit equals or exceeds the maximum amount of time that the temperature area is permitted to be maintained at temperatures outside of the temperature limit, selecting to operate an air comfort device, that is configured to heat or cool the temperature area, so as to maintain a temperature of the temperature area during a future period of time within the received temperature limit rather than maintaining the temperature of the temperature area during the future period of time outside of the temperature limit.

2. The method of claim 1, further comprising:
receiving, by the computing device, a cost target value that indicates a target level of spend for regulating temperatures in the temperature area over a period of time; and
modifying, based on the received cost target value, at least one of the temperature limit or the tolerance measure.

3. The method of claim 2, further comprising operating the air comfort device based on the at least one of the modified temperature limit or the modified tolerance measure.

4. The method of claim 1, further comprising generating a projected cost value based on at least one of the temperature limit or the tolerance measure, wherein the projected cost value indicates an estimated level of spend required to regulate temperatures in the temperature area over a period of time according to the at least one of the temperature limit or the tolerance measure.

5. The method of claim 4, wherein the temperature limit and the tolerance measure are received based on a selection of a comfort range.

6. The method of claim 1, wherein the computing device receives the temperature limit and the tolerance measure based on a single user selection of a first comfort range that indicates both the temperature limit and the tolerance measure, wherein the computing device stores data that represents a plurality of comfort ranges including the first comfort range, wherein each comfort range indicates a respective temperature limit and a respective tolerance measure.

7. The method of claim 6, wherein the first comfort range further indicates a projected cost value.

8. The method of claim 6, further comprising:
receiving, by the computing device based on a user input, an umbrella flexibility range for at least the first comfort range and a second comfort range of the plurality of comfort ranges;
determining, based on the umbrella flexibility range, a first projected cost value for the first comfort range and a second projected cost value for the second comfort range; and
displaying, on an electronic display of the computing device, indications of the first projected cost value for the first comfort range and the second projected cost value for the second comfort range.

9. The method of claim 4, wherein the projected cost value is based on at least one factor selected from the group consisting of: a weighted average of the number of hours operating according to a comfort range, an ideal set point for an energy, the size of a range of temperatures identified by the temperature limit, and the relative location of an ideal set point with respect to the range of temperatures identified by the temperature limit.

10. The method of claim 1, wherein the computing device is configured, in response to determining that the total amount of time that the temperature area has been maintained at temperatures outside of the temperature limit is less than the maximum amount of time that the temperature area is permitted to be maintained at temperatures outside of the temperature limit, to permit the air comfort device to maintain the temperature of the temperature area during the future period of time outside of the temperature limit.

11. The method of claim 1, wherein:
the tolerance measure indicates the maximum amount of time that the temperature area is permitted to be maintained at temperatures outside of the temperature limit over the course of a month; and the total amount of time that the temperature area has been maintained at temperatures outside of the temperature limit is limited to times during the course of the month.

12. The method of claim 1, wherein:

receiving the temperature limit comprises identifying a user selection of the temperature limit from a user interface presented on an electronic display of the computing device; and receiving the tolerance measure comprises identifying a user selection of the tolerance measure from a user interface presented on the electronic display of the computing device.

13. A computer-readable medium having instructions stored thereon that, when executed by one or more processors, cause performance of operations comprising:

receiving a temperature limit that indicates a maximum temperature to maintain in a temperature area or a minimum temperature to maintain in the temperature area;

receiving a tolerance measure that indicates a maximum amount of time that the temperature area is permitted to be maintained at temperatures outside of the temperature limit;

identifying a total amount of time that the temperature area has been maintained at temperatures outside of the temperature limit;

determining whether the total amount of time that the temperature area has been maintained at temperatures outside of the temperature limit equals or exceeds the maximum amount of time that the temperature area is permitted to be maintained at temperatures outside of the temperature limit; and in response to determining that the total amount of time that the temperature area has been maintained at temperatures outside of the temperature limit equals or exceeds the maximum amount of time that the temperature area is permitted to be maintained at temperatures outside of the temperature limit, selecting to operate an air comfort device, that is configured to heat or cool the temperature area, so as to maintain a temperature of the temperature area during a future period of time within the received temperature limit rather than maintaining the temperature of the temperature area during the future period of time outside of the temperature limit.

14. The non-transitory computer-readable medium of claim 13, wherein the operations further comprise:

receiving a cost target value that indicates a target level of spend for regulating temperatures in the temperature area over a period of time; and modifying, based on the received cost target value, at least one of the temperature limit or the tolerance measure.

15. The non-transitory computer-readable medium of claim 14, wherein the operations further comprise operating the air comfort device based on the at least one of the modified temperature limit or the modified tolerance measure.

16. The non-transitory computer-readable medium of claim 13, wherein the operations further comprise generating a projected cost value based on at least one of the temperature limit or the tolerance measure, wherein the projected cost value indicates an estimated level of spend required to regulate temperatures in the temperature area over a period of time according to the at least one of the temperature limit or the tolerance measure.

17. The non-transitory computer-readable medium of claim 16, wherein the temperature limit and the tolerance measure are received based on a selection of a comfort range.

18. The non-transitory computer-readable medium of claim 13, wherein the operations comprise receiving the temperature limit and the tolerance measure based on a single user selection of a first comfort range that indicates both the temperature limit and the tolerance measure, including identifying the first comfort range from among a plurality of comfort ranges, wherein each of the plurality of comfort ranges indicates a respective temperature limit and a respective tolerance measure.

19. The non-transitory computer-readable medium of claim 18, wherein the first comfort range further indicates a projected cost value.

20. The method of claim 1, wherein the total amount of time that the temperature area has been maintained at temperatures outside of the temperature limit indicates a total amount of time that the temperature area has previously been maintained at temperatures outside of the temperature limit.

\* \* \* \* \*